(12) United States Patent
Ihara et al.

(10) Patent No.: US 8,830,019 B2
(45) Date of Patent: Sep. 9, 2014

(54) CYLINDRICAL BONDED MAGNET STRUCTURE

(75) Inventors: Kohei Ihara, Tokushima (JP); Syuji Matsumura, Higashimatsuyama (JP); Keiki Nishino, Osaki (JP)

(73) Assignees: Nichia Corporation, Anan-Shi (JP); I&P Co., Ltd., Higashimatsuyama-Shi (JP); K Technology Corporation, Kami-Gun (JP)

(*) Notice: Subject to any disclaimer, the term of this patent is extended or adjusted under 35 U.S.C. 154(b) by 0 days.

(21) Appl. No.: 13/822,636

(22) PCT Filed: Sep. 27, 2011

(86) PCT No.: PCT/JP2011/071984
§ 371 (c)(1),
(2), (4) Date: Mar. 13, 2013

(87) PCT Pub. No.: WO2012/043525
PCT Pub. Date: Apr. 5, 2012

(65) Prior Publication Data
US 2013/0169395 A1    Jul. 4, 2013

(30) Foreign Application Priority Data

Sep. 29, 2010  (JP) ................................ 2010-218276
Aug. 30, 2011  (JP) ................................ 2011-188040

(51) Int. Cl.
| | |
|---|---|
| *H01F 1/00* | (2006.01) |
| *H02K 33/16* | (2006.01) |
| *H01F 7/02* | (2006.01) |
| *H02K 1/34* | (2006.01) |
| *H01F 7/08* | (2006.01) |
| *H02K 15/03* | (2006.01) |

(52) U.S. Cl.
CPC ................ *H01F 7/02* (2013.01); *H02K 33/16* (2013.01); *H01F 7/0278* (2013.01); *H02K 1/34* (2013.01); *H01F 7/081* (2013.01); *H02K 15/03* (2013.01)
USPC .......................................................... 335/296

(58) Field of Classification Search
USPC .......................................................... 335/296
See application file for complete search history.

(56) References Cited

U.S. PATENT DOCUMENTS

| | | | |
|---|---|---|---|
| 5,247,410 A | | 9/1993 | Ebihara et al. |
| 5,306,701 A | * | 4/1994 | Israelsson et al. ............ 505/213 |

(Continued)

FOREIGN PATENT DOCUMENTS

| | | |
|---|---|---|
| JP | 03-70462 | 3/1991 |
| JP | 04-53072 | 2/1992 |

(Continued)

OTHER PUBLICATIONS

International Search Report for corresponding International Application No. PCT/JP2011/071984, Oct. 25, 2011.

*Primary Examiner* — Mohamad Musleh
*Assistant Examiner* — Lisa Homza
(74) *Attorney, Agent, or Firm* — Mori & Ward, LLP

(57) ABSTRACT

The structure includes cylindrical columnar and tubular bonded magnets. The columnar magnet has at least one pair of N and S poles that are alternately produced in the longitudinal direction. The tubular magnet surrounds the columnar magnet, and has at least one pair of N and S poles that are alternately produced in the longitudinal direction. Poles of the columnar and tubular magnets that are opposed to each other in the direction perpendicular to the axis of the columnar magnet as the propulsion force direction are of opposite magnetic polarity so that magnetic fields are produced in the direction perpendicular to the propulsion force direction. The surface magnetic flux density profile balance can be smoothed by adjusting higher and lower parts of the profiles of the columnar and tubular magnets.

11 Claims, 10 Drawing Sheets

(56) References Cited

U.S. PATENT DOCUMENTS

| | | | |
|---|---|---|---|
| 7,145,423 B2 * | 12/2006 | Suzuki et al. | 335/229 |
| 7,446,443 B2 * | 11/2008 | Naganuma et al. | 310/49.08 |
| 2003/0205941 A1 * | 11/2003 | Suzuki et al. | 310/49 R |
| 2004/0003849 A1 | 1/2004 | Rausch et al. | |
| 2004/0051607 A1 | 3/2004 | Rausch et al. | |
| 2006/0044096 A1 * | 3/2006 | Suzuki et al. | 335/222 |
| 2007/0165902 A1 * | 7/2007 | Matsumura et al. | 381/396 |
| 2008/0204174 A1 | 8/2008 | Ito et al. | |
| 2011/0109173 A1 * | 5/2011 | Sugita et al. | 310/12.18 |
| 2012/0242086 A1 * | 9/2012 | Yang | 290/50 |
| 2012/0242175 A1 * | 9/2012 | Yang | 310/30 |

FOREIGN PATENT DOCUMENTS

| | | |
|---|---|---|
| JP | 2003-303714 | 10/2003 |
| JP | 2004-514393 | 5/2004 |
| JP | 3952190 B2 | 9/2004 |
| JP | 2005-73466 | 3/2005 |
| JP | 2008-237004 | 10/2008 |
| JP | 2010-130728 | 6/2010 |

\* cited by examiner

CYLINDRICAL BONDED MAGNET STRUCTURE

BACKGROUND OF THE INVENTION

1. Technical Field

The present invention relates to a cylindrical columnar or tubular magnetized bonded magnet structure with N and S poles being alternately provided in the axial direction.

2. Background Art

In various fields, columnar or tubular magnets are used which have a plurality of permanent magnet members that are arranged with their same polarity sides being opposed to each other. For example, they are used in a foreign matter removal device for removing iron powder and the like from food, and a stator for linear motors (see Japanese Patent Laid-Open Publication Nos. JP 2003-303,714 A; JP 2005-73,466 A; and 3,952,190 B). In such columnar or tubular magnets, the N and S poles are alternately arranged on the outer peripheral surface in the axial direction so that magnetic lines of force radially extend from each magnetic pole. In such magnets, magnetic poles appear on the outer peripheral surface. For example, as for an N pole, magnetic lines of force radially extend from the N pole in the direction perpendicular to the axial direction, and then curve toward an S pole adjacent to the N pole along long arc lines. Accordingly, many magnetic fields can be produced along the outer peripheral surface of the columnar or tubular magnets. For this reason, when such magnets are used for linear motors or linear actuators, it is possible to provide strong propulsion force. Hereinafter, such magnets are referred to as alternately-magnetized multipolar magnets.

In the case where a stator is constructed of a columnar or tubular cylindrical alternately-magnetized multipolar magnet and used for a linear motor or linear actuator, a slider of the linear motors or linear actuator has a coil that is arranged concentrically with and perpendicularly to the axial direction of the columnar or tubular alternately-magnetized multipolar magnet (see JP 2005-73,466 A; and 3,952,190 B). The slider can be propelled in the axial direction of the columnar or tubular alternately-magnetized multipolar magnet by interaction between a current that flows in the coil and magnetic fields that are produced by the permanent magnet of the stator.

CITATION LIST

See also Japanese Patent Laid-Open Publication No. JP 2010-130,728 A

In the aforementioned case, to most efficiently provide propulsion force to the slider in the axial direction of the magnet, the magnetic lines of force that extend from the magnetic poles formed in the outer peripheral surface are required to keep extending in the direction perpendicular to the axial direction of the magnet until the magnetic lines of force radially reach the coil, which is arranged concentrically with and perpendicularly to the axial direction of the magnet included in the slider. The reason is that the current, which flows in the coil included in the slider, is provided with propulsion force by magnetic lines of force that extend in the direction that is perpendicular to the axial direction of the magnet as the propulsion direction, but the current, which flows in the coil included in the slider, is not provided with propulsion force by magnetic lines of force that extend in the axial direction of the magnet as the propulsion direction. For this reason, to most efficiently and effectively provide the interaction of between the magnetic fields, which are produced by the columnar or tubular alternately-magnetized multipolar magnet of the stator, and the current, which flows in the coil included in the slider, it is important that many magnetic lines of force, which extend from the magnetic poles formed in the outer peripheral surface, linearly reach the current, which flows in the coil included in the slider, in the direction perpendicular to the propulsion force, in other words, in the direction perpendicular to the axial direction of the magnet of the stator.

However, although the magnetic lines of force produce magnetic fields in the radial direction in conventional columnar or tubular alternately-magnetized multipolar magnets, many magnetic lines of force radially extend in the direction perpendicular to the axial direction from one pole of the magnets and then curve toward another pole adjacent to the one pole along arc lines. For example, as shown in FIG. 16, after extending from an N pole of a magnet 601, many magnetic lines of force radially extend in the direction perpendicular to the axial direction of the magnet, and then curve along long arc lines toward S poles that are arranged adjacent to the N pole in the forward and backward directions with the many magnetic lines of force moving apart from each other. In other words, although the magnetic lines of force are directed in the direction perpendicular to the axial direction of the magnet in proximity to the outer peripheral surface of the magnet, the magnetic lines of force are deviated from the direction perpendicular to the axial direction of the magnet as the magnetic lines of force extend away from the outer peripheral surface of the magnet. That is, it cannot be said that many magnetic lines of force effectively or linearly reach the current, which flows in the coil included in the slider.

On the other hand, in order that, after being produced and extending from one magnetic pole part in the outer peripheral surface of the cylindrical tubular alternately-magnetized multipolar magnet of the stator, many magnetic lines of force can linearly reach the current, which flows in the coil included in the slider, in the direction perpendicular to the axial direction of the magnet, it is conceivable that another magnetic pole part is arranged at the position that is opposed to the one magnetic pole in the direction perpendicular to the axial direction of the magnet, and is located outside relative to the coil. In this case, the another magnetic pole part is required to produce sufficient magnetic field to prevent the magnetic lines of force, which extend from one magnetic pole, from curving toward opposite polarity parts that are arranged adjacent to the one pole part. When consideration is given to the entire magnet, the magnetic lines of force of the columnar or tubular alternately-magnetized multipolar magnet of the stator radially extend in the direction perpendicular to the axial direction of the magnet. In order to prevent the magnetic lines of force, which radially extend in the direction perpendicular to the axial direction of the magnet, from curving toward the opposite polarity parts, which are arranged adjacent to the one pole part, it is necessary to form the another magnetic pole, which produce such sufficient magnetic field, around the outer peripheral surface of the magnet so as to surround the one pole part, which is formed on the outer peripheral surface of the magnet.

To achieve this, it is necessary to arrange another tubular alternately-magnetized multipolar magnet as another stator on outer periphery side of the columnar or tubular alternately-magnetized multipolar magnet of the stator so as to surround the stator. In the case where conventional columnar or tubular alternately-magnetized multipolar magnets are produced, it is necessary to arrange a plurality of pieces of columnar or tubular axially magnetized sintered magnets with their same polarity parts being opposed to each other, and to bond the pieces to each other by an adhesive. In this method, when the magnet pieces are bonded, it is necessary to oppose the same polarity sides of the magnet pieces to each other. For this reason, the magnet pieces repel each other, which makes the bonding process very dangerous and reduce the workability. In addition, it is necessary to hold the magnet pieces by using a holding tool until the adhesive hardens. As a result, the productivity is low. In addition to this, if this method is used to construct the another tubular alternately-magnetized multipolar magnet as another stator, which produces strong magnetic fields on the outer periphery side, the workability and productivity will be further reduced. On the other hand, pole parts will dispersively formed not only the inner peripheral surface but also on the outer peripheral surface of the another tubular alternately-magnetized multipolar magnet, which serves as the another stator on the outer periphery side of the stator. This will be a problem when the strong magnetic field is efficiently produced in the inner periphery surface of the another stator.

The present invention is aimed at solving the above problem, and its main object is to provide a cylindrical bonded magnet structure that can produce magnetic fields perpendicularly to a propulsion force direction, and can compose linear motors and linear actuators applicable in various fields.

SUMMARY OF INVENTION

To achieve the above object, a cylindrical bonded magnet structure according a first aspect of the present invention includes a columnar bonded magnet, and a tubular bonded magnet. The columnar bonded magnet has at least one pair of N and S poles that are alternately produced in the longitudinal direction of the columnar bonded magnet. The tubular bonded magnet has a cylindrical tubular shape that is positioned concentrically with the axis of the columnar bonded magnet, and surrounds the outer periphery of the columnar bonded magnet. The tubular bonded magnet has at least one pair of N and S poles that are alternately produced in the inner periphery of the tubular bonded magnet in the longitudinal direction of the columnar bonded magnet. Each pole of the columnar bonded magnet and each pole in the inner periphery of the tubular bonded magnet that are opposed to each other in the direction perpendicular to the axis of the columnar bonded magnet are of opposite magnetic polarity.

In a cylindrical bonded magnet structure according a second aspect of the present invention, magnetic lines of force that extend from each magnetic pole in the outer periphery of the columnar bonded magnet can radially extend toward the corresponding magnetic pole in the inner periphery of the tubular bonded magnet, which is opposed to said each pole in the outer periphery of the columnar bonded magnet in the direction perpendicular to the axial direction of the columnar bonded magnet, The radial magnetic lines of force from the columnar bonded magnet can center the axis of the columnar bonded magnet. Magnetic lines of force that extend from each magnetic pole in the inner periphery of the tubular bonded magnet can extend toward the corresponding magnetic pole in the outer periphery of the columnar bonded magnet, which is opposed to said each pole in the inner periphery of the tubular bonded magnet in the direction perpendicular to the axial direction of the columnar bonded magnet. That is, the direction of magnetic flux where the magnetic lines of force that extend from a part with one polarity of the columnar bonded magnet extend to a part with the opposite polarity, which is arranged adjacent to the part with one polarity, of the columnar bonded magnet is opposite to the direction of magnetic flux where magnetic lines of force that extend from a part with the opposite polarity in the inner peripheral surface of the tubular bonded magnet extend to a part with the one polarity, which is arranged adjacent to the part with the opposite polarity, of the tubular bonded magnet. Accordingly, in this magnet structure, the magnetic flux that extends from one polarity part of one of the cylindrical columnar and tubular bonded magnets does not curve toward the opposite polarity part of the one of the cylindrical columnar and tubular bonded magnets, but extends toward the opposite polarity part of another of the cylindrical columnar and tubular bonded magnets, which is located in the direction perpendicular to the axial direction of the columnar bonded magnet. As a result, the direction of magnetic flux that extends from one polarity part of the cylindrical columnar tubular bonded magnet agree with the direction of magnetic flux that extends from the opposite polarity part of the tubular bonded magnet. Consequently, magnetic lines of force that extend from each magnetic pole in the outer periphery of the columnar bonded magnet can radially extend toward the corresponding magnetic pole in the inner periphery of the tubular bonded magnet, which is located in the direction perpendicular to the axial direction of the columnar bonded magnet, while magnetic lines of force that extend from each magnetic pole in the inner periphery of the tubular bonded magnet can extend toward the corresponding magnetic pole in the outer periphery of the columnar bonded magnet, which is located in the direction perpendicular to the axial direction of the columnar bonded magnet.

In a cylindrical bonded magnet structure according a third aspect of the present invention, a first surface magnetic flux density profile can have higher points in a first direction and lower points in a second direction. The first surface magnetic flux density profile is obtained by measuring the surface magnetic flux densities along the outer periphery of the columnar bonded magnet. The first direction passes the center of the circular section of the columnar bonded magnet. The second direction intersects perpendicularly to the first direction. The lower points are lower than higher points in surface magnetic flux density profile. A second surface magnetic flux density profile can have higher points in a first direction and lower points in a second direction. The second surface magnetic flux density profile is obtained by measuring the surface magnetic flux densities along the inner periphery of the tubular bonded magnet. The first direction passes the center of the circular section of the tubular bonded magnet. The second direction intersects perpendicularly to the first direction. The lower points are lower than higher points in surface magnetic flux density profile. The cylindrical columnar and tubular bonded magnets are orientated so that the first direction of the columnar bonded magnet intersects perpendicularly to the first direction of the tubular bonded magnet. According to this construction, the higher and lower points of the first surface magnetic flux density profile, which is obtained by measuring the surface magnetic flux densities along the outer periphery of the columnar bonded magnet, can be smoothed by the lower and higher points of the second surface magnetic flux density profile, which is obtained by measuring the surface magnetic flux densities along the outer periphery of the tubular bonded magnet. That is, it is possible to smooth the profile balance of the magnetic field in the direction perpendicular to the axial direction of the columnar bonded magnet, which is the direction of propulsion force.

In a cylindrical bonded magnet structure according a fourth aspect of the present invention, the tubular bonded magnet can include separated members having shapes that are obtained by diving the hollow part of the tubular bonded magnet along the axial direction. According to this construction, since the tubular bonded magnet is constructed not of a unitary member, but of separated members that are obtained by diving the tubular bonded magnet along the longitudinal direction, it is easily increase magnetic force when the separated members are formed.

In a cylindrical bonded magnet structure according a fifth aspect of the present invention, the cylindrical columnar and tubular bonded magnets can be formed together. According to this construction, the pitch between the different magnetic poles adjacent to each other in the longitudinal direction of the columnar bonded magnet of the magnet structure can match with the pitch between the different magnetic poles adjacent to each other in the longitudinal direction of the tubular bonded magnet of the magnet structure.

A magnet structure according to a sixth aspect of the present invention includes a columnar bonded magnet and a yoke member. The columnar bonded magnet has at least one pair of N and S poles that are alternately produced in the longitudinal direction of the columnar bonded magnet. The yoke member forms a magnetic circuit that centers the axis of the columnar bonded magnet and surrounds the outer periphery of the columnar bonded magnet.

A magnet structure according to a seventh aspect of the present invention includes a columnar bonded magnet, and a tubular bonded magnet. The columnar bonded magnet is alternately magnetized into a multipolar magnet in the longitudinal direction of the columnar bonded magnet. The tubular bonded magnet centers the axis of the columnar bonded magnet and surrounds the outer periphery of the columnar bonded magnet. The inner periphery of the tubular bonded magnet is alternately magnetized into a multipolar magnet in the longitudinal direction of the columnar bonded magnet. Parts of the cylindrical columnar and tubular bonded magnets are of opposite magnetic polarity.

In a magnet structure according am eighth aspect of the present invention, the cylindrical columnar and tubular bonded magnets can be orientated so that a concave parts of surface magnetic flux density profile of the columnar bonded magnet substantially faces a convex parts of surface magnetic flux density profile of the tubular bonded magnet. The surface magnetic flux density profile of the columnar bonded magnet is obtained by measuring the surface magnetic flux densities along the outer periphery of the columnar bonded magnet. The surface magnetic flux density profile of the tubular bonded magnet is obtained by measuring the surface magnetic flux densities along the inner periphery of the tubular bonded magnet.

DESCRIPTION OF EMBODIMENT(S)

Figure 1:
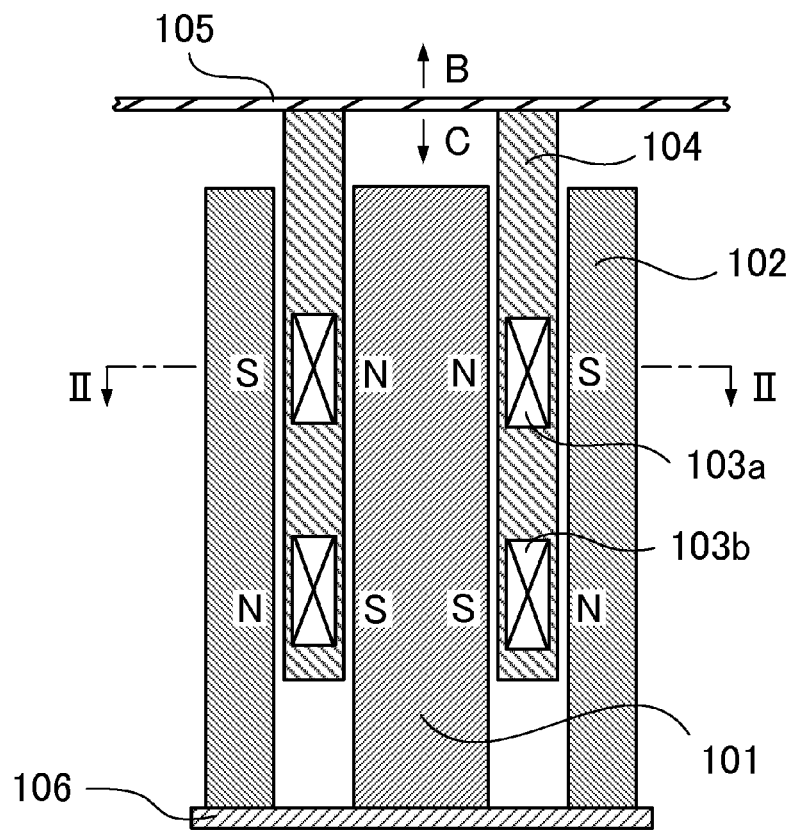
FIG. 1: Vertical cross-sectional view showing a magnet structure according to an embodiment of the present invention.

Preferred embodiments according to the present invention are described with reference to the drawings. It should be appreciated, however, that the embodiments described below are illustrations of a cylindrical bonded magnet structure to give a concrete form to technical ideas of the invention, and a cylindrical bonded magnet structure of the invention is not specifically limited to description below. Furthermore, it should be appreciated that the members shown in claims attached hereto are not specifically limited to members in the embodiments. Unless otherwise specified, any dimensions, materials, shapes and relative arrangements of the parts described in the embodiments are given as an example and not as a limitation. Additionally, the sizes and the positional relationships of the members in each of drawings are occasionally shown larger exaggeratingly for ease of explanation. Members same as or similar to those of this invention are attached with the same designation and the same reference numerals and their description is omitted. In addition, a plurality of structural elements of the present invention may be configured as a single part that serves the purpose of a plurality of elements, on the other hand, a single structural element may be configured as a plurality of parts that serve the purpose of a single element. Also, the description of some of examples or embodiments may be applied to other examples, embodiments or the like.

Figure 2:
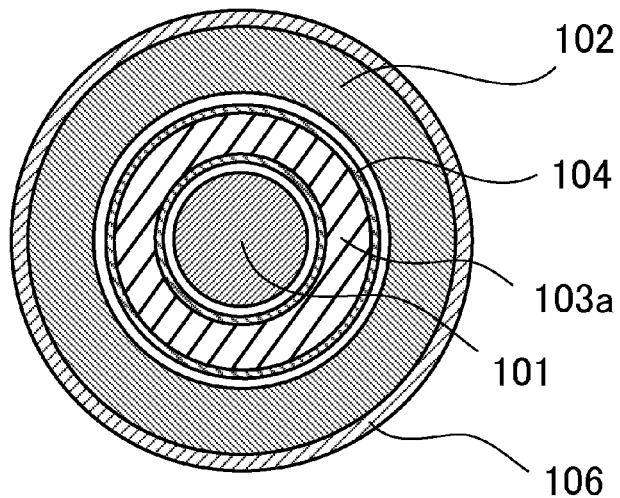
FIG. 2: Horizontal cross-sectional view of the magnet structure shown in FIG. 1 taken along the line II-II.
Figure 3:
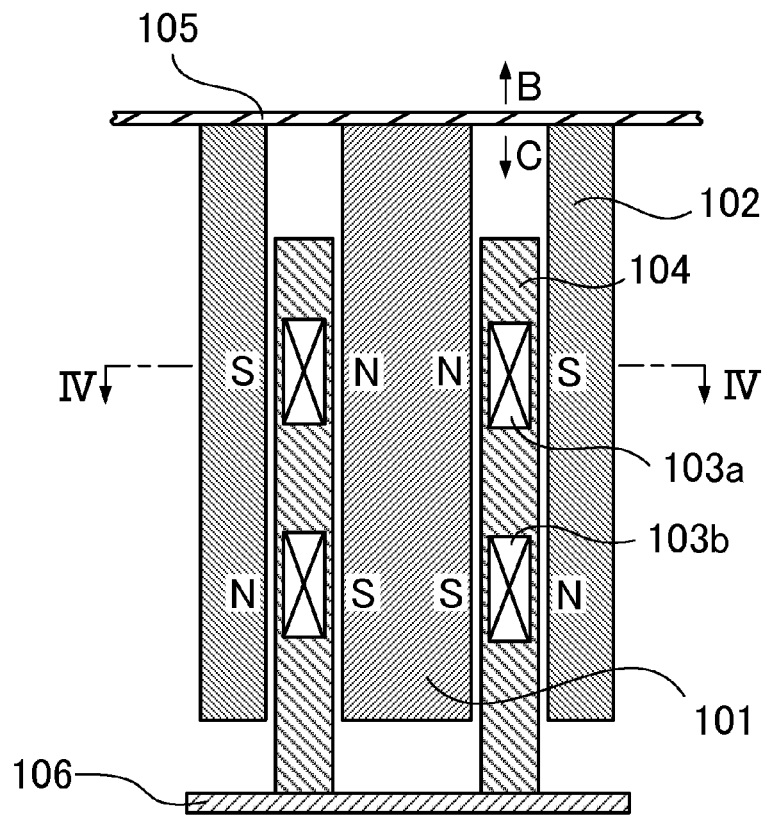
FIG. 3: Vertical cross-sectional view showing a magnet structure according to another embodiment.
Figure 4:
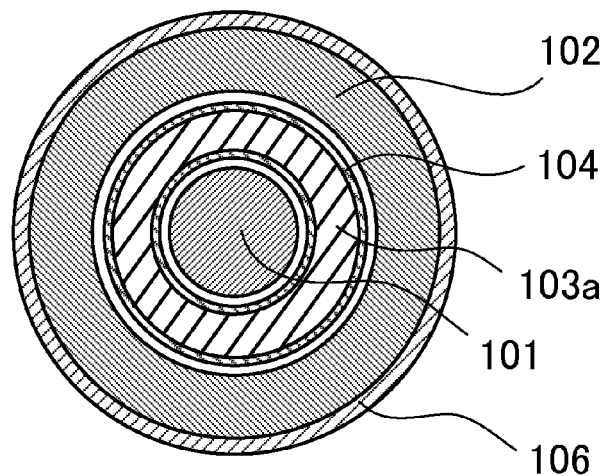
FIG. 4: Horizontal cross-sectional view of the magnet structure shown in FIG. 3 taken along the line IV-IV.
Figure 9:
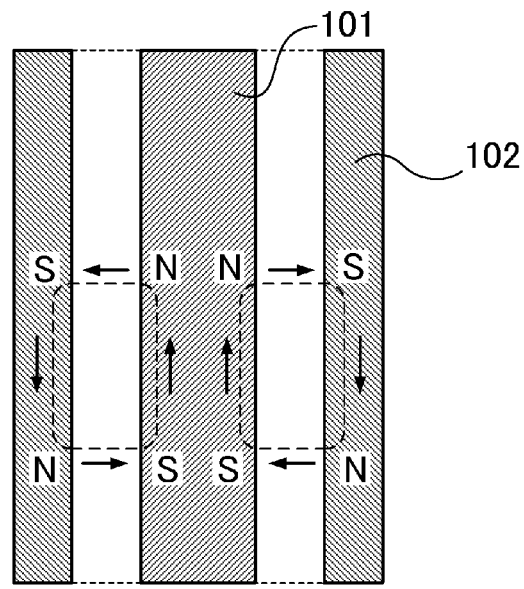
FIG. 9: Vertical cross-sectional view showing magnetic paths of each of the magnet structures shown in FIGS. 1 and 3.
Figure 10:
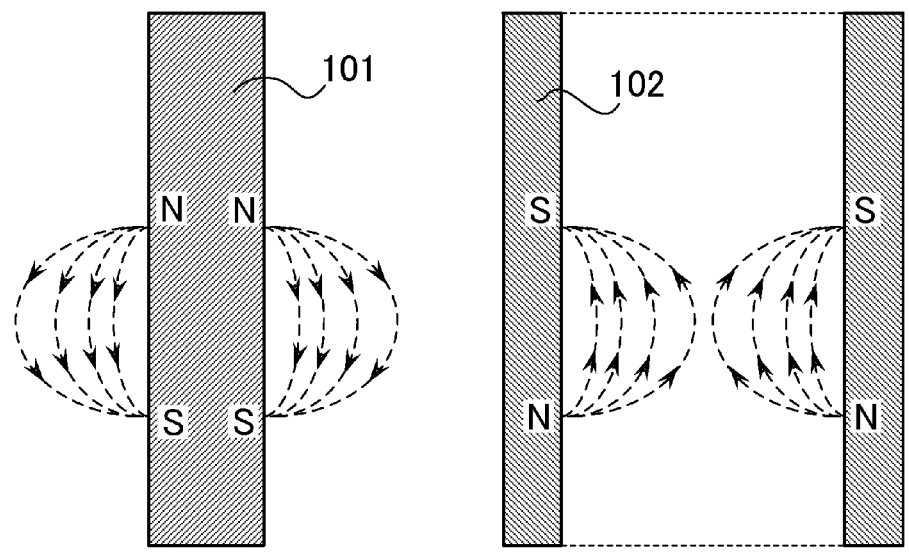
FIG. 10: Vertical cross-sectional view showing magnetic paths of the cylindrical columnar and tubular magnets in each of the magnet structures shown in FIGS. 1 and 3.

FIG. 1 is a vertical cross-sectional view showing a cylindrical bonded magnet structure according to an embodiment of the present invention. FIG. 2 is a horizontal cross-sectional view showing this cylindrical bonded magnet structure. FIG. 3 is a vertical cross-sectional view showing a cylindrical bonded magnet structure according to another embodiment of the present invention. FIG. 4 is a horizontal cross-sectional view showing this cylindrical bonded magnet structure. FIG. 9 is a schematic view showing magnetic paths of each of the magnet structures shown in FIGS. 1 and 3. FIG. 10 is a vertical cross-sectional view showing magnetic paths of cylindrical columnar and tubular magnets in each of the magnet structures shown in FIGS. 1 and 3. In FIG. 1 and FIG. 3, edge parts of a support portion (slider) 105 are not shown for ease of illustration.

An exemplary method for producing the bonded magnets can be provided by the method disclosed in the specification of Japanese Patent Application No. 2009-268,143. Alternately-magnetized multipolar bonded magnets may be used which are produced not only by formation processes of conventional production methods but also magnetic orientation processes of conventional production methods. Also, alternately-magnetized multipolar sintered magnets may be used which are produced by conventional methods that assemble magnet pieces on one after another, though such conventional method has low productivity. That is, combination of cylindrical columnar and tubular bonded magnets is not limited as long as combination of cylindrical columnar and tubular bonded magnets can provide the magnetic paths schematically shown in FIG. 10, and each of the cylindrical columnar and tubular bonded magnets includes at least one pair of N and S poles that are alternately produced in the longitudinal direction. In the case where the cylindrical columnar and tubular bonded magnets are bonded magnets, the magnetic pole arrangements of the cylindrical columnar and tubular bonded magnets shown in FIG. 9 can be formed together. The columnar bonded magnet according to this embodiment shown in FIG. 9 may has a hollow central part.

Figure 17:
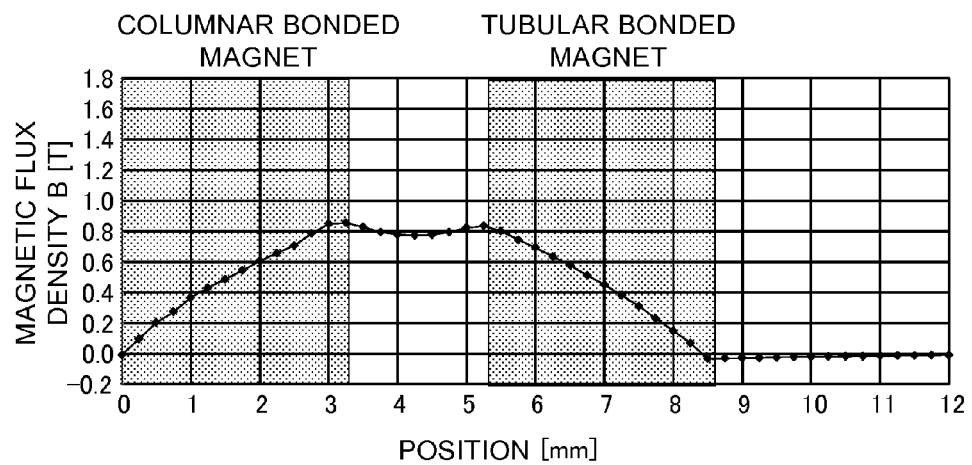
FIG. 17: Graph showing the magnetic flux density distribution of the cylindrical columnar and tubular bonded magnets shown in FIG. 9 in the case where the distance between the magnets is 2 mm.
Figure 18:
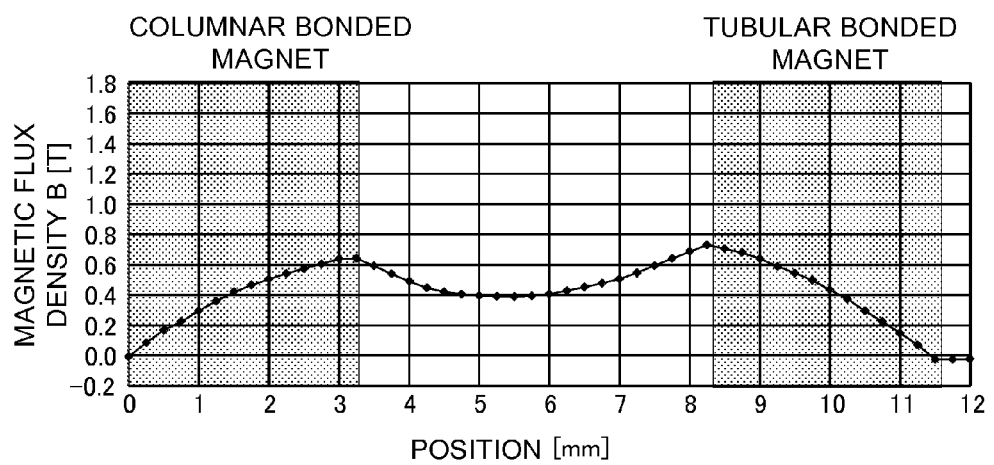
FIG. 18: Graph showing the magnetic flux density distribution of the cylindrical columnar and tubular bonded magnets shown in FIG. 9 in the case where the distance between the magnets is 5 mm.

The magnetic flux density distribution between the cylindrical columnar and tubular bonded magnets 101 and 102 shown in FIG. 9 varies in accordance with the distance between the magnets. FIGS. 17 and 18 are graphs showing exemplary magnetic flux density distributions that are obtained by magnetic field simulation based on a finite element method. In these graphs, the distributions are intended to represent magnets that have a residual magnetic flux density of 1 T, a coercive force of 758 kA/m, and a magnetic permeability of 1.05 H/m. The pitch between N and S poles of each bonded magnet is specified 7 mm. The radius of the columnar bonded magnet 101 is specified 3.25 mm. The difference between the inner and outer diameters of the tubular bonded magnet 102 is specified 3.25 mm. FIG. 17 shows the case where the distance between the magnets is specified 2 mm. FIG. 18 shows the case where the distance between the magnets is specified 5 mm.

The difference between the embodiments shown in FIGS. 1 and 3 is that a stator includes magnets, and a slider includes coils in FIG. 1, while a stator includes coils, and a slider includes magnets in FIG. 3. In the case where the support portion (slider) 105 is moved in the direction shown by the arrow B in FIG. 1, the current flows in the clockwise direction in FIG. 2 in a coil 103a, while the current flows in the counterclockwise direction in FIG. 2 in a coil 103b. On the other hand, in the case where the support portion (slider) 105 is moved in the direction shown by the arrow B in FIG. 3, the current flows in the counterclockwise direction in FIG. 4 in the coil 103a, while the current flows in the clockwise direction in FIG. 4 in the coil 103b.

In both the cases of FIGS. 1 and 3, in the case where the slider is moved or at rest, if the currents in the coils 103a and 103b flow in the same direction, braking force can be applied to the slider relative to the support portion (slider) 105. In this case, the balance between both the currents may be variable.

Although one pair of N and S poles are provided in the embodiments shown in FIGS. 1 and 3, two or more pairs of alternately-arranged N and S poles can be provided. The support portion (slider) 105, the support portion (stator) 106, and a coil support portion 102 are schematically shown for illustration of the cylindrical bonded magnet structures according to the embodiments of the present invention. They are not limited to this illustration.

Figure 5:
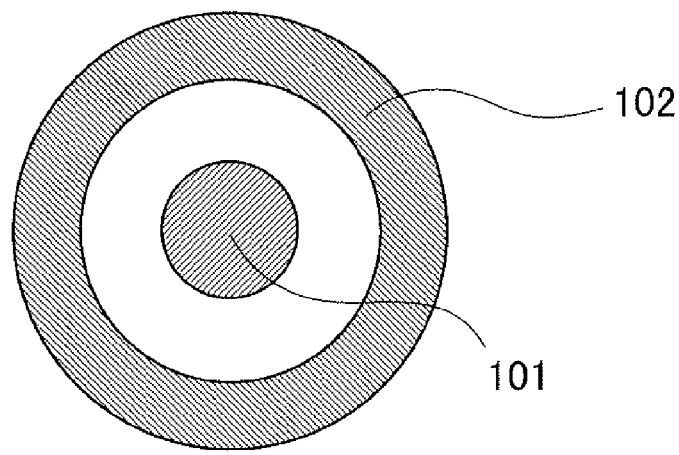
FIG. 5: Horizontal cross-sectional view showing only magnets in each of the magnet structures shown in the cross-sectional views of FIGS. 1 and 3 taken along the lines II-II and IV-IV.
Figure 6:
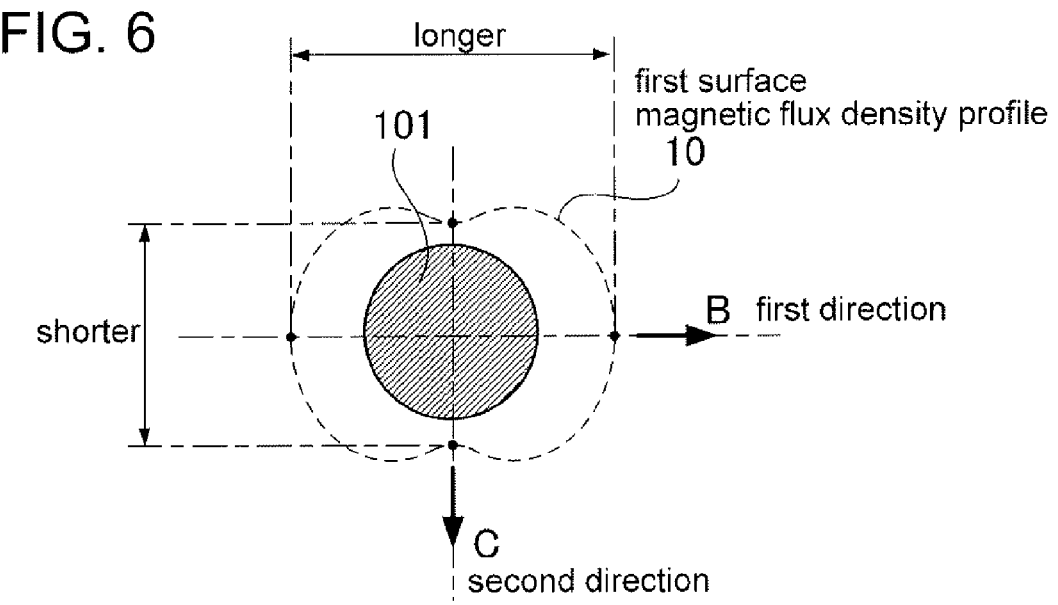
FIG. 6: Horizontal cross-sectional view showing a first surface magnetic flux density profile of one of the magnets shown in FIG. 5 that is located inside.
Figure 7:
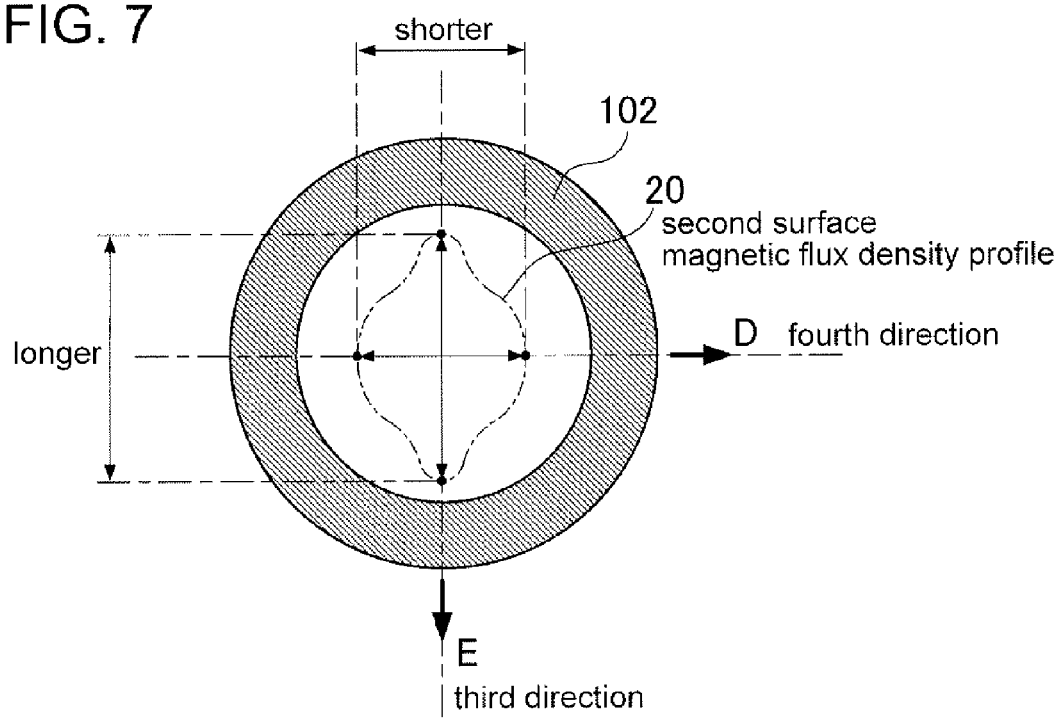
FIG. 7: Horizontal cross-sectional view showing a second surface magnetic flux density profile of another of the magnets shown in FIG. 5, which is located outside.

FIG. 5 is a diagram view showing only the cylindrical columnar and tubular bonded magnets 101 and 102 with the other members being removed from each of the magnet structures shown in the cross-sectional views of FIGS. 1 and 3 taken along the lines II-II and IV-IV. FIGS. 6 and 7 schematically show first and second surface magnetic flux density profiles that are obtained by measuring the surface magnetic flux densities along the outer and inner peripheral surfaces of the cylindrical columnar and tubular bonded magnets, respectively.

Figure 15:
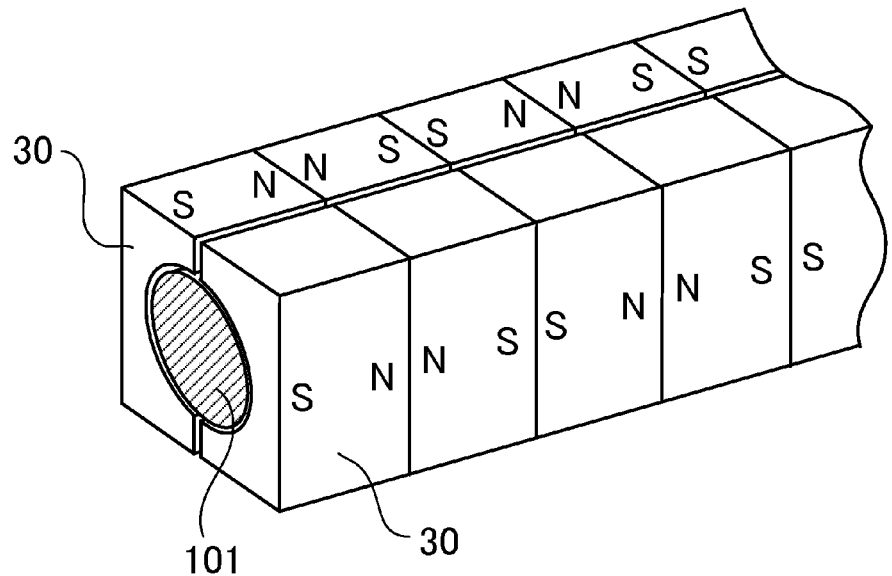
FIG. 15: Perspective view showing an exemplary process for producing the columnar bonded magnet shown in FIG. 6.

The first surface magnetic flux density profile of the columnar bonded magnet shown in FIG. 6 has higher points in a first direction B that passes the center of the columnar bonded magnet, and lower points in a second direction C that intersects perpendicularly to the first direction B. The lower points are lower than the higher points in surface magnetic flux density profile. For example, as shown in FIG. 15, in the case where the columnar bonded magnet 101 is formed by dies 30. The dies 30 are arranged on the right and left sides, and has inner shapes that are obtained by dividing the columnar bonded magnet. Thus, a surface magnetic flux density profile can be provided which is not symmetric with respect to a point as the center. In FIG. 15, when the columnar bonded magnet is formed by injection molding, magnetic orientation will be insufficient at the top and bottom of the columnar bonded magnet where the opposed surfaces of the dies are opposed to each other. As a result, magnetic flux densities will be low at the top and bottom of the columnar bonded magnet.

Figure 8:
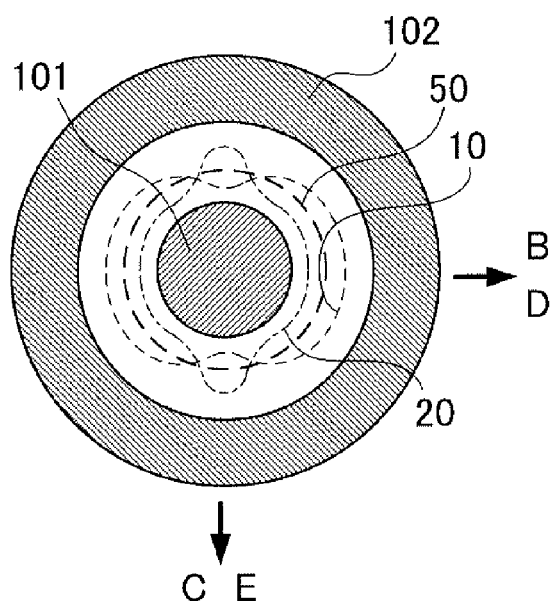
FIG. 8: Horizontal cross-sectional view showing a third surface magnetic flux density profile of the combination of the magnets shown in FIGS. 6 and 7.
Figure 11:
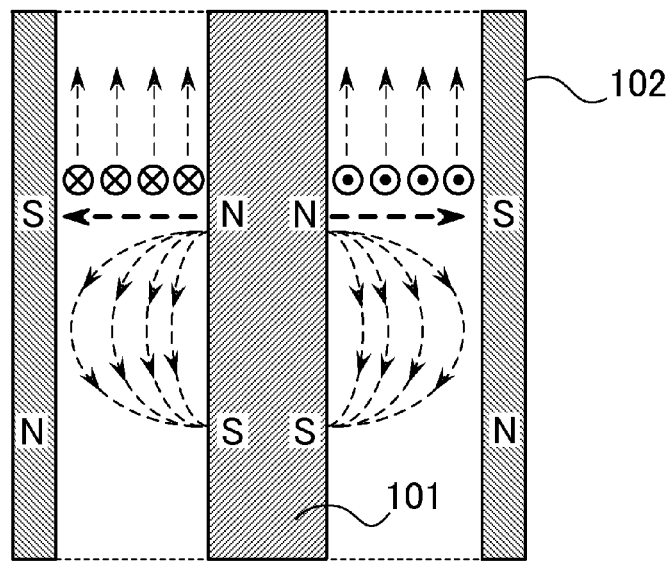
FIG. 11: Vertical cross-sectional view showing magnetic lines of force between the opposed surfaces of the cylindrical columnar and tubular bonded magnets.
Figure 16:
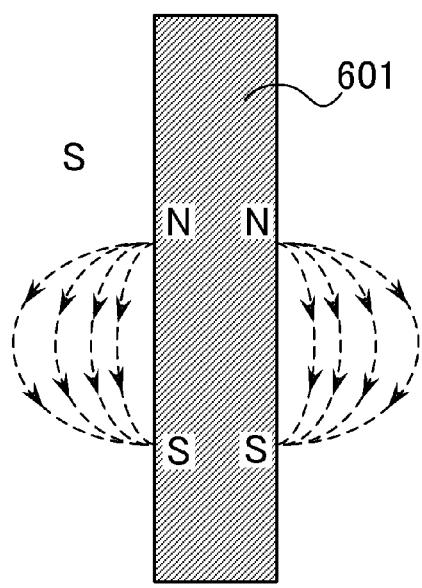
FIG. 16: Vertical cross-sectional view showing the direction of magnetic lines of force in a conventional bonded magnet.

On the other hand, the second surface magnetic flux density profile of the tubular bonded magnet shown in FIG. 7 has higher points in a first direction D that passes the center of the tubular bonded magnet, and lower points in a second direction E that intersects perpendicularly to the first direction D. The lower points are lower than the higher points in surface magnetic flux density profile. According to these magnets, as shown in FIG. 8, in the case where the cylindrical columnar and tubular bonded magnets shown in FIGS. 6 and 7 are orientated so that the direction B agrees with the direction D while the direction C agrees with the direction E, the higher magnetic flux density parts of one of the cylindrical columnar and tubular bonded magnets can complement the lower magnetic flux density parts of another of the cylindrical columnar and tubular bonded magnets as shown by the thick dashed line in a third surface magnetic flux density profile 50 that is obtained by the combination of the cylindrical columnar and tubular bonded magnets in FIG. 8. Accordingly, the third surface magnetic flux density profile can have a shape close to a circle. Therefore, it is possible to provide strong and uniform magnetic flux densities over the entire perimeter. As a result, in comparison with magnetic lines of force of conventional magnets that have a long curved component and short linear components as shown in FIG. 16, since the opposed magnetic pole parts of the magnets according to these embodiments are of opposite magnetic polarity as shown in FIG. 11, the linear component of the magnetic lines of force can be longer. Consequently, it is possible to provide strong magnetic force. Therefore, it is possible to greatly increase propulsion force.

Figure 12:
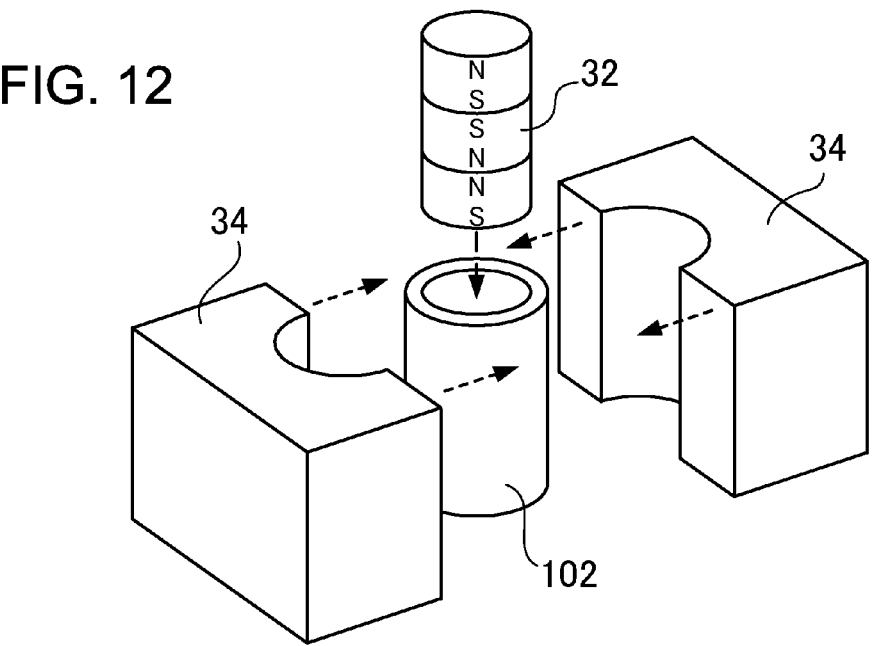
FIG. 12: Perspective view showing the process where the tubular bonded magnet is integrally formed.

The tubular bonded magnet is not limited to an integrally-formed member. The tubular bonded magnet can be constructed of separated members having shapes that are obtained by diving the hollow part of the tubular bonded magnet along the axial direction. In this construction, the magnetic force can be easily increased. That is, in the case where the tubular bonded magnet is previously integrally formed in a cylindrical tubular shape, as shown in FIG. 12, when this tubular bonded magnet is formed by the dies 34, the size of a rod-shaped magnet 32 is limited which is inserted into the central hollow part of this tubular bonded magnet and used for magnetic orientation of this tubular bonded magnet. In particular, in the case where the size of the tubular bonded magnet is reduced, it is necessary to reduce the size of the rod-shaped magnet 32 for magnetic orientation. However, it is not easy to increase the magnetic force of such a small rod-shaped magnet.

Figure 13:
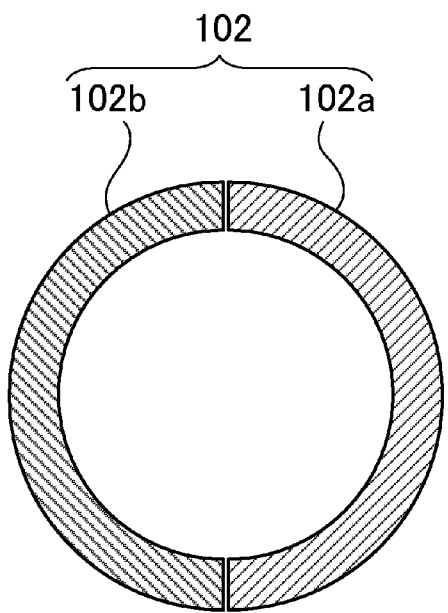
FIG. 13: Horizontal cross-sectional view showing an exemplary tubular bonded magnet constructed of separated members that are obtained by dividing the tubular bonded magnet into halves.
Figure 14:
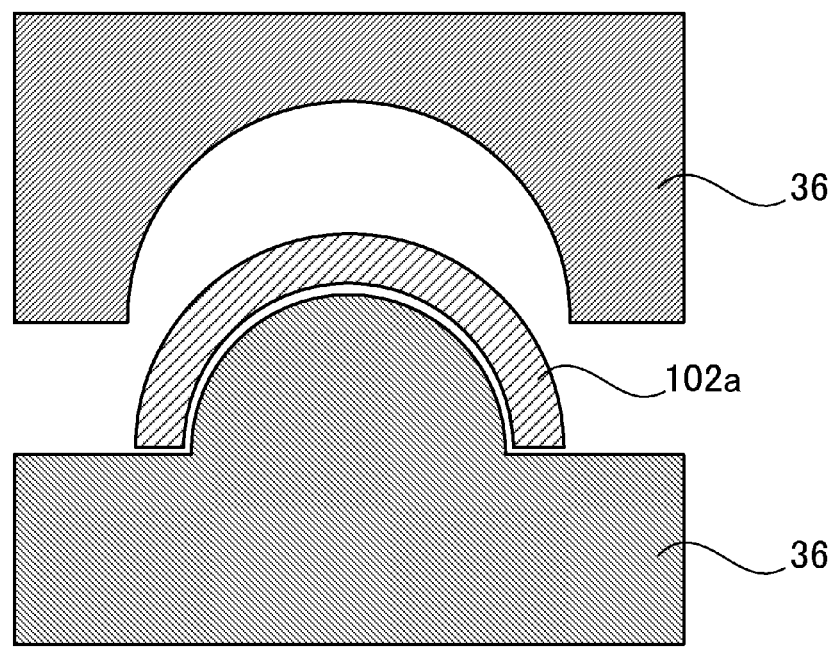
FIG. 14: Horizontal cross-sectional view showing an exemplary process where the separated member shown in FIG. 13 is formed.

In the case where the tubular bonded magnet is constructed of separated members 102a and 102b having shapes that are obtained by diving the hollow part of the tubular bonded magnet along the axial direction as shown in FIG. 13, in other words, in the case where the tubular bonded magnet is constructed of separated members each of which does not have a closed hollow part, the separated members 102a and 102b do not have a cylindrical hollow part. Accordingly, the magnet for magnetic orientation is not limited to a rod shape. As a result, the die design can be flexible. For example, a relatively large die 36 as shown in FIG. 14 can be used. Therefore, the magnetic force can be easily increased.

Conventional bonded magnets have a disadvantage that their magnetic properties are insufficient. Contrary to this, according to the aforementioned columnar bonded magnet, the linear magnetic fields perpendicular to the propulsion force direction, which are effective at providing propulsion force, can be intensively produced 360 degrees. According to the aforementioned columnar bonded magnet, effective magnetic flux density is increased which is effective for the electric field that is produced to provide propulsion force. As a result, the increased effective magnetic flux density can be addressed to the insufficient properties. As for applications, the aforementioned columnar bonded magnet can be used as a linear motor or linear actuator. The aforementioned columnar bonded magnet is effective for linear reciprocating actuators that are required to meet complex requirements such as miniaturization/weight-reduction, fracture and chipping resistance, and small pitch between the magnetic poles, which requires high dimensional accuracy. These requirements are difficult for sintered magnets. In particular, the aforementioned columnar bonded magnet is also effective for a magnet structure of actuators that has a relatively small stroke.

According to the aforementioned columnar bonded magnet, the linear magnetic fields perpendicular to the propulsion force direction, which are effective at providing propulsion force, can be intensively produced 360 degrees. Accordingly, in comparison with conventional magnets, magnetic field areas that have the effective magnetic flux density will extend toward the electric fields. Correspondingly, the effective areas of the electric fields will be increased which are produced to provide propulsion force. That is, since the magnetic field areas having larger effective magnetic flux density can be surely provided, the specification (e.g., the number of coil turns and the coil diameter) of the coils for producing electric fields to be combined with the aforementioned columnar bonded magnet can be flexible. As a result, in the case where the number of coil turns is increased, the propulsion force can be increased. Also, in the case where the coil diameter is increased, the rated power can be surely increased.

Conventional bonded magnets have a disadvantage that they are large. The reason is that the magnetic properties of the conventional bonded magnets are not sufficient. Contrary to this, the bonded magnets according to the foregoing embodiments are lightweight as compared with sintered magnets. In addition to this, according to the aforementioned bonded magnet structures, the density of effective magnetic flux can be increased which is effective for the electric field that is produced to provide propulsion force. As a result, the bonded magnets according to the foregoing embodiments can be further reduced in size. In the case of typical linear motors or linear actuators that include a sintered magnet, the magnet is often included in the stator. However, according to the aforementioned bonded magnet structure, the magnet can be included in the slider, while the coil can be included in the stator. Also, in the aforementioned bonded magnet structure, the coil can be included in the slider, while the magnet can be included in the stator. The arrangement of the magnet can be flexibly selected depending on applications. In the case the coil is included in the stator, it is not necessary to take weight-reduction of the coil into consideration dissimilar to the case where the coil is included in the slider. As a result, the number of coil turns can be increased so that the propulsion force can be increased. Also, the coil diameter can be increased so that the rated power can be surely increased. Although it has been described that the electric energy is converted into the propulsion force as kinetic energy, it is also conceivable that kinetic energy can be converted into electric energy, in other words, that the magnet structure according to the present invention can be used for electric power generation. Also, in the case of electric power generation, it is important to increase the rated power.

Figure 19:
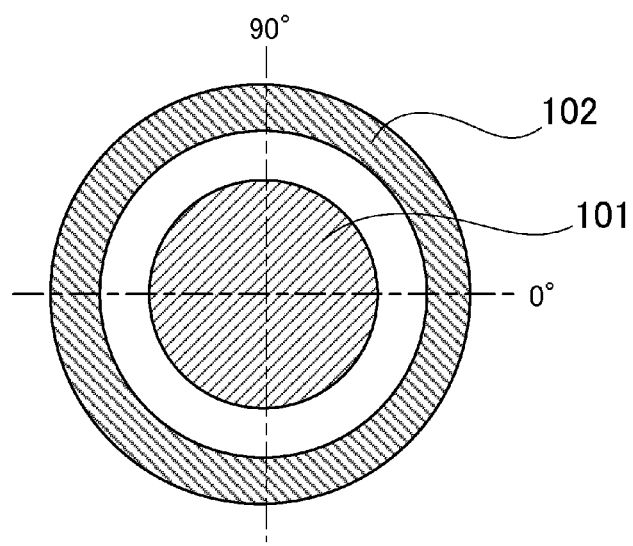
FIG. 19: Schematic view showing the angular position of the cylindrical columnar and tubular bonded magnets.
Figure 20:
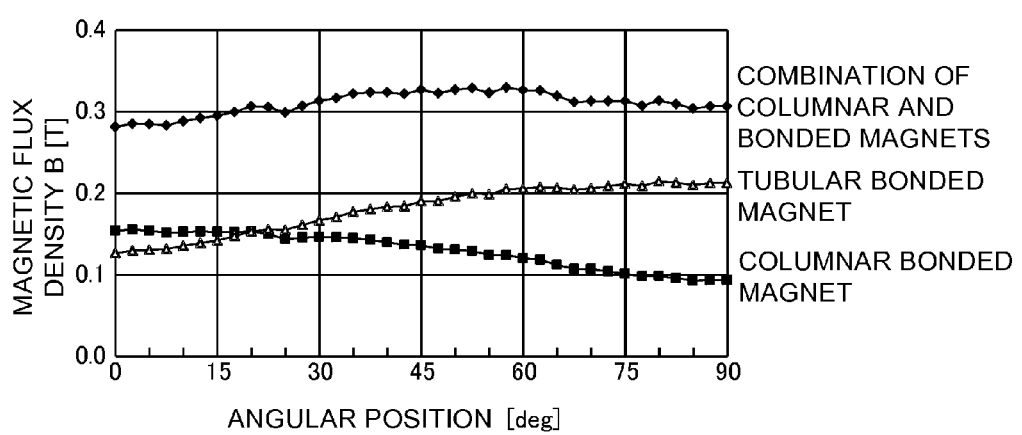
FIG. 20: Graph showing the magnetic flux density distribution of the combination of the cylindrical columnar and tubular bonded magnets that is obtained by magnetic field simulation based on a finite element method.

According to the combination of the cylindrical columnar and tubular bonded magnets, it is possible to smooth the profile balance of the magnetic field that is radially produced in the direction perpendicular to the propulsion force axis direction. Accordingly, it can be expected that the propulsion force direction can be stable. FIG. 20 is a graph showing the magnetic flux density distribution of the combination of the cylindrical columnar and tubular bonded magnets that is obtained by magnetic field simulation based on a finite element method. In this graph, the horizontal axis represents the angular position [deg] of each of the cylindrical columnar and tubular bonded magnets in the horizontal cross-sectional view shown in FIG. 19. That is, the angular position in FIG. 20 represents from 0 to 90 degrees in the counterclockwise direction, where 0 degree is defined by an arbitrary line that passes the center of the columnar bonded magnet 101 shown in FIG. 19. In this simulation, the radius of the columnar bonded magnet 101 is specified 10 mm. The difference between the inner and outer diameters of the tubular bonded magnet 102 is specified 5 mm. The distance between the outer diameter of the columnar bonded magnet 101 and the inner diameter of the tubular bonded magnet 102 is specified 5 mm. The pitch between the N and S poles of each bonded magnet is specified 7 mm. The magnetic permeability of each bonded magnet is specified 1.05 H/m. The residual magnetic flux densities of the columnar bonded magnet 101 are specified 1 and 0.5 T as the maximum and minimum values at 0 and 90 degrees, respectively. The residual magnetic flux densities of the columnar bonded magnet continuously vary between 0 and 90 degrees. The residual magnetic flux densities of the tubular bonded magnet 102 are specified 0.5 and 1 T as the minimum and maximum values at 0 and 90 degrees, respectively. The residual magnetic flux densities of the tubular bonded magnet continuously vary between 0 and 90 degrees. The values in the magnetic flux density distribution in the simulation shown in FIG. 20 are calculated at the midpoint between the outer diameter of the columnar bonded magnet 101 and the inner diameter of the tubular bonded magnet 102.

It has been described that, in the magnet structure according to the present invention, the tubular bonded magnet centers the axis of the columnar bonded magnet and surrounds the columnar bonded magnet, and poles of the cylindrical columnar and tubular bonded magnets that are opposed to each other in the direction perpendicular to the axis of the columnar bonded magnet are of opposite magnetic polarity. However, the magnet structure according to the present invention is not limited to this. That is, a magnet structure can include a columnar bonded magnet and a cylindrical tubular yoke member. The columnar bonded magnet has at least one pair of N and S poles that are alternately produced in the longitudinal direction of the columnar bonded magnet. The yoke member forms a magnetic circuit that centers the axis of said columnar bonded magnet and surrounds the columnar bonded magnet. The magnetic lines of force that extend from each magnetic pole of the cylindrical magnet are likely to be drawn into the cylindrical tubular yoke member. As a result, it is possible to effectively produce effective linear magnetic fields, which extend perpendicularly to the propulsion force direction. The material to be used for the yoke member preferably has a relative permeability of 1000 or greater, and the maximum magnetic flux density 1 T or greater. As the relative permeability and the maximum permeability of the material to be used for the yoke member increase, the magnetic reluctance of the cylindrical tubular yoke member decreases so that the magnetic lines of force that extend from each magnetic pole of the cylindrical columnar magnet can be efficiently drawn into the cylindrical tubular yoke member.

INDUSTRIAL APPLICABILITY

A cylindrical bonded magnet structure according to the present invention can be suitably used for a linear motor or a linear actuator.

What is claimed is:

1. A magnet structure comprising:
    a columnar bonded magnet having at least one pair of N and S poles that are alternately provided in an axial direction of the columnar bonded magnet, the columnar bonded magnet being a single piece;
    a tubular bonded magnet having a cylindrical tubular shape that is positioned concentrically with the axis of said columnar bonded magnet and surrounds the outer periphery of the columnar bonded magnet, the tubular bonded magnet having at least one pair of N and S poles that are alternately provided in the inner periphery of the tubular bonded magnet in the axial direction of the columnar bonded magnet, the tubular bonded magnet being a single piece; and
    a coil support portion having a cylindrical tubular shape with a coil embedded therein, the coil support portion being positioned concentrically with the axis of said columnar bonded magnet and surrounds the outer periphery of the columnar bonded magnet, the tubular bonded magnet surrounding the outer periphery of the coil support portion,
    wherein each pole of the columnar bonded magnet and each pole in the inner periphery of the tubular bonded magnet that are opposed to each other in the direction perpendicular to the axis of the columnar bonded magnet are of opposite magnetic polarity, and
    wherein the magnet structure is formed with yokeless permanent magnets.

2. The magnet structure according to claim 1, wherein magnetic lines of force that extend from each magnetic pole in the outer periphery of the columnar bonded magnet radially extend toward the corresponding magnetic pole in the inner periphery of the tubular bonded magnet, which is opposed to said each pole in the outer periphery of the columnar bonded magnet in the direction perpendicular to the axial direction of the columnar bonded magnet, and the radial magnetic lines of force from the columnar bonded magnet center the axis of the columnar bonded magnet,
    wherein magnetic lines of force that extend from each magnetic pole in the inner periphery of the tubular bonded magnet extend toward the corresponding magnetic pole in the outer periphery of the columnar bonded magnet, which is opposed to said each pole in the inner periphery of the tubular bonded magnet in the direction perpendicular to the axial direction of the columnar bonded magnet.

3. The magnet structure according to claim 1, wherein the cylindrical columnar and tubular bonded magnets are respectively formed integrally in one piece.

4. The magnet structure according to claim 1,
    wherein each piece of N and S pole pair of the columnar bonded magnet are magnetically and continuously coupled to each other in the axial direction, and
    wherein another each piece of N and S pole pair of the tubular bonded magnet are magnetically and continuously coupled to each other in the axial direction.

5. The magnet structure according to claim 4, wherein the tubular bonded magnet comprises a plurality of separated members that are obtained by dividing the tubular bonded magnet in the axial direction, and the separated members are magnetically and continuously coupled to each other.

6. A linear actuator comprising a magnet structure according to claim 1 with a slider and a stator.

7. A magnet structure comprising:
    a columnar bonded magnet having at least one pair of N and S poles that are alternately provided in an axial direction of the columnar bonded magnet, the columnar bonded magnet being a single piece;
    a tubular bonded magnet having a cylindrical tubular shape that is positioned concentrically with the axis of said columnar bonded magnet and surrounds the outer periphery of the columnar bonded magnet, the tubular bonded magnet having at least one pair of N and S poles that are alternately provided in the inner periphery of the tubular bonded magnet in the axial direction of the columnar bonded magnet, the tubular bonded magnet being a single piece; and
    a coil support portion having a cylindrical tubular shape with a coil embedded therein, the coil support portion being positioned concentrically with the axis of said columnar bonded magnet and surrounds the outer periphery of the columnar bonded magnet, the tubular bonded magnet surrounding the outer periphery of the coil support portion, wherein each pole of the columnar bonded magnet and each pole in the inner periphery of the tubular bonded magnet that are opposed to each other in the direction perpendicular to the axis of the columnar bonded magnet are of opposite magnetic polarity, wherein the columnar bonded magnet is magnetized to have a first surface magnetic flux density profile measuring the surface magnetic flux densities along the outer periphery of the columnar bonded magnet being longer in a first direction that passes the center of the circular section of the columnar bonded magnet than that in a second direction that is perpendicular to the first direction, wherein the tubular bonded magnet is magnetized to have a second surface magnetic flux density profile measuring the surface magnetic flux densities along the inner periphery of the tubular bonded magnet being longer in a third direction that passes the center of the circular section of the tubular bonded magnet than that in a fourth direction that is perpendicular to the third direction, and wherein the cylindrical columnar and tubular bonded magnets are orientated so that the first direction of the columnar bonded magnet is perpendicular to the third direction of the tubular bonded magnet.

8. The magnet structure according to claim 7, wherein the tubular bonded magnet includes separated members having shapes that are obtained by diving the hollow part of the tubular bonded magnet along the axial direction.

9. A magnet structure comprising:
a columnar bonded magnet that is alternately magnetized into a multipolar magnet in an axial direction of the columnar bonded magnet, the columnar bonded magnet being a single piece;
a tubular bonded magnet that centers the axis of the columnar bonded magnet and surrounds the outer periphery of the columnar bonded magnet, the inner periphery of the tubular bonded magnet being alternately magnetized into a multipolar magnet in the axial direction of the columnar bonded magnet, the tubular bonded magnet being a single piece; and
a coil support portion having a cylindrical tubular shape with a coil embedded therein, the coil support portion being positioned concentrically with the axis of said columnar bonded magnet and surrounds the outer periphery of the columnar bonded magnet, the tubular bonded magnet surrounding the outer periphery of the coil support portion,
wherein parts of the cylindrical columnar and tubular bonded magnets are of opposite magnetic polarity, and
wherein the magnet structure is formed with yokeless permanent magnets.

10. The magnet structure according to claim 9, wherein the cylindrical columnar and tubular bonded magnets are orientated so that a concave parts of surface magnetic flux density profile of the columnar bonded magnet substantially faces a convex parts of surface magnetic flux density profile of the tubular bonded magnet, wherein the surface magnetic flux density profile of the columnar bonded magnet is obtained by measuring the surface magnetic flux densities along the outer periphery of the columnar bonded magnet, and the surface magnetic flux density profile of the tubular bonded magnet is obtained by measuring the surface magnetic flux densities along the inner periphery of the tubular bonded magnet.

11. A magnet structure comprising:
a columnar bonded magnet having at least one pair of N and S poles that are alternately provided in an axial direction of the columnar bonded magnet, the columnar bonded magnet being a single piece;
a tubular bonded magnet having a cylindrical tubular shape that is positioned concentrically with the axis of said columnar bonded magnet and surrounds the outer periphery of the columnar bonded magnet, the tubular bonded magnet having at least one pair of N and S poles that are alternately provided in the inner periphery of the tubular bonded magnet in the axial direction of the columnar bonded magnet, the tubular bonded magnet being a single piece; and
a coil support portion having a cylindrical tubular shape with a coil embedded therein, the coil support portion being positioned concentrically with the axis of said columnar bonded magnet and surrounds the outer periphery of the columnar bonded magnet, the tubular bonded magnet surrounding the outer periphery of the coil support portion,
wherein each pole of the columnar bonded magnet and each pole in the inner periphery of the tubular bonded magnet that are opposed to each other in the direction perpendicular to the axis of the columnar bonded magnet are of opposite magnetic polarity,
wherein each piece of N and S pole pair of the columnar bonded magnet are magnetically and continuously coupled to each other in the axial direction, and
wherein another each piece of N and S pole pair of the tubular bonded magnet are magnetically and continuously coupled to each other in the axial direction.

* * * * *